United States Patent [19]

Thurston

[11] Patent Number: 4,687,928

[45] Date of Patent: Aug. 18, 1987

[54] POSITION DETECTOR

[75] Inventor: Marlin O. Thurston, Columbus, Ohio

[73] Assignee: R. H. Burton Company, Grove City, Ohio

[21] Appl. No.: 681,925

[22] Filed: Dec. 14, 1984

[51] Int. Cl.⁴ .............................................. G01D 5/34
[52] U.S. Cl. ........................... 250/231 SE; 340/347 P
[58] Field of Search ............. 250/227, 231 SE, 237 G; 340/347 P; 356/395

[56] References Cited

U.S. PATENT DOCUMENTS 3,824,587  7/1974  Fowler ............................ 340/347 P
4,291,976  9/1981  McMahon .......................... 250/227

Primary Examiner—Eugene R. LaRoche
Assistant Examiner—Steven J. Mottola
Attorney, Agent, or Firm—Mueller and Smith

[57] ABSTRACT

A position detector for use with a code carrier which defines a position and has alternating radiation transmissive and non-transmissive regions which define a multibit output is disclosed. The position detector includes a photodetector array mounted on one side of the code carrier and a radiation source mounted on the detector on the side opposite the photodetector array. A radiation guide is interposed between the code carrier and the photodetector array and has a plurality of radiation transmissive paths each of which is in exclusive communication with one photodetector.

20 Claims, 14 Drawing Figures

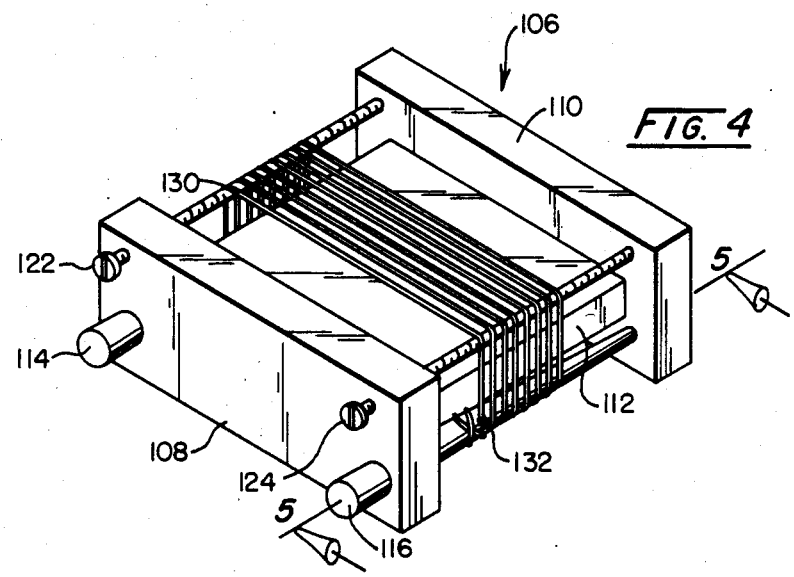
FIG. 4
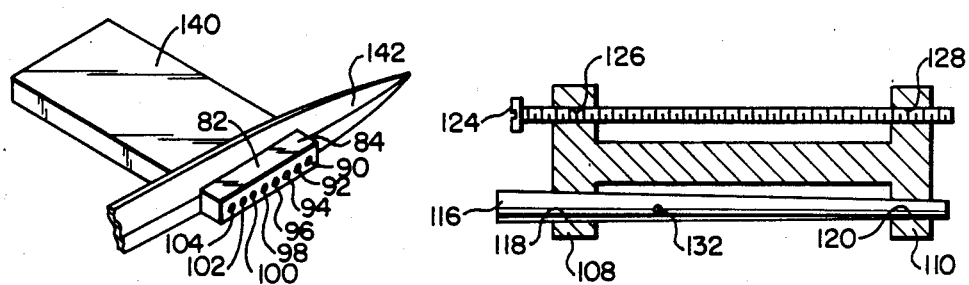
FIG. 7
FIG. 5
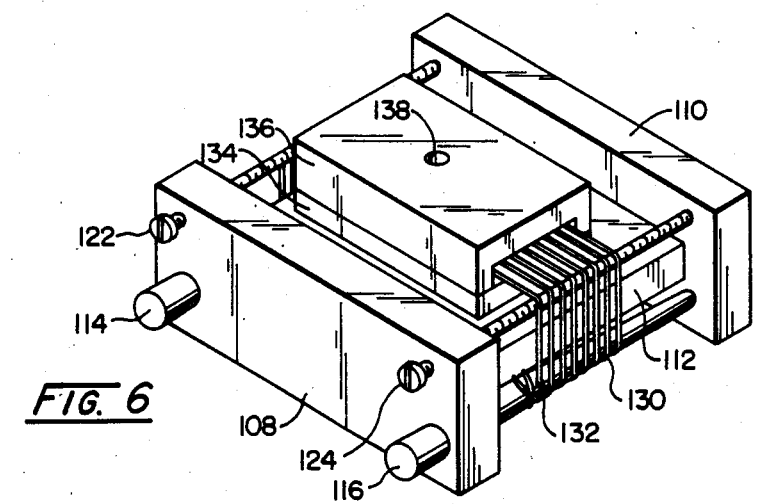
FIG. 6

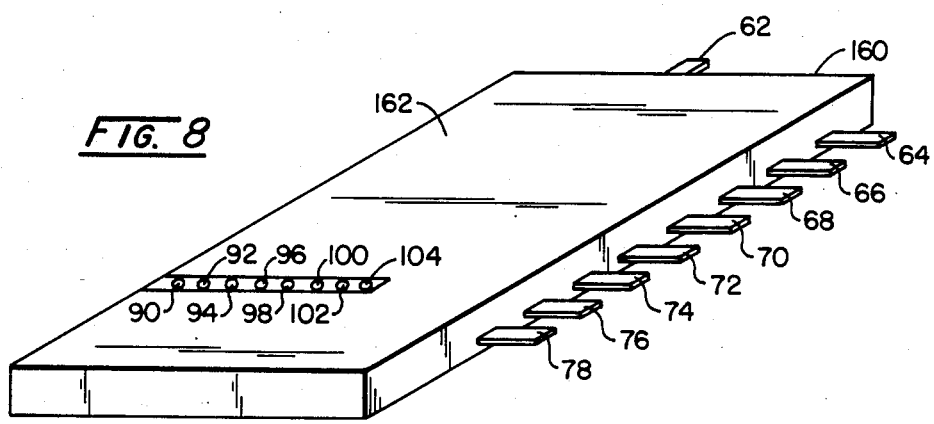
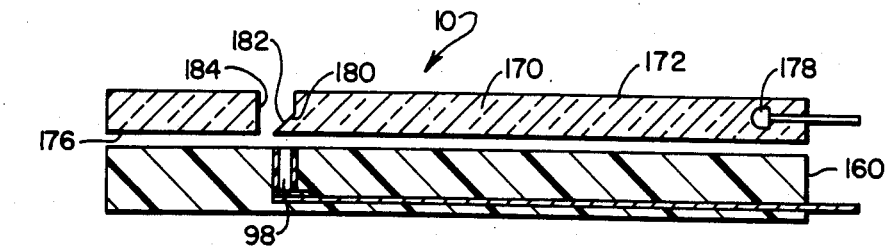

POSITION DETECTOR

BACKGROUND OF THE INVENTION

This invention relates to a device which determines the position of a rotatable element. More specifically, it relates to a relatively small, highly precise, position detector suitable for use in precision instruments. Additionally, the position detector is capable of providing indentical position indicating outputs for different angular positions of a rotatable element when such outputs are required due to symmetry of the rotatable element or for any other reason.

One such machine having a symmetrical rotatable element is an ophthalmic instrument called a refractor which is described in detail in commonly-assigned U.S. patent application Ser. No. 06/513,707, now U.S. No. 4,523,822. In that device, the outputs of an optical position detector are used to provide a digital readout of the angular orientation of a motor-driven lens mount, although such detector is operable for a hand-driven mount assembly too. Such an optical position detector and rotatable lens mount are shown generally in FIG. 1.

Referring to FIG. 1, a motor-driven lens mount 12 is rotatably mounted in a housing 14 by a bearing 16. While the assembly shown in FIG. 1 rotates on ball bearing 16, other lens assemblies are friction mounted for rotation. The optical position detector includes an annular code carrier 18 which is rigidly mounted on and rotatable with the lens mount. A positional code carried by the code carrier 18 is read optically through the utilization of a high intensity light source 20 which is rigidly supported in a mount 22 on one side of the code carrier 18 and extends in a generally radical direction with respect thereto. Source 20 is seen to include a light emitting diode (LED) 20a which is optically coupled in light transferring relationship with a transparent rod 20b. The base of the encoder mount supports a linear array 24 of 8 photodetectors in the form of phototransistors mounted on a ceramic substrate 26. These phototransistors extend in a generally radical direction in complement with respect to the code carrier 18 and are aligned with the transparent rod 20b. A mask 28 which has a narrow elongate slit is rigidly secured to the mount and interposed between the light emitting rod 20b and the code carrier 18 such that the slit is laterally aligned with the rod 20b and the phototransistor array 24. In order to determine the angular orientation of the lens mount 12, the code carrier 18 is provided with an 8-bit selectively opaque-transparent code contained in eight concentric rings. The phototransistor array 24 is mounted such that each phototransistor is directly below and aligned with one of the concentric rings on the code carrier 18. Thus, a phototransistor is active or inactive depending upon whether the portion of the ring thereabove is transparent or opaque. If it is transparent, light can pass through the ring to activate the associated phototransistor. The code on the carrier 18 is arranged such that there are two sequentially arranged 180° increments on each half of the ring. This arrangement is provided because the rotatable lens mount 12 contains a cylindrical lens which has 180° symmetry. Thus, it is desirable to provide an indentical output from the code carrier 18 for positions which are diametrically opposite each other, ie. which are 180° apart. Preferably, the position code must be arranged to provide a position defining transition or change in the opaque-transparent portion of the position code for each one degree angular increment of the code carrier.

It has been found that the outputs from the optical position detector described above could be made relatively unambiguous, ie. no spurious outputs during the transition from one angular position to the next adjacent angular position, if the position code on the code carrier were arranged such that there was a transition from opaque to transparent or vice versa in only one of the concentric rings for adjacent angular positions. This is because multiple transitions between adjacent angular positions were found to cause some of the phototransistors in the array to change state before others and hence cause a spurious output from the array when the code carrier was moved from one angular position to an adjacent angular position. Such a spurious output is highly undersirable in a precision instrument, such as a refractor, where the output of the photodetector is being read by an operator to determine the corrective lenses (power and axis) necessary for a patient. In order to make the positional code of the code carrier have a transition in only one ring for adjacent 1° positions, a Gray code arrangement was used where the transparent regions were assigned a logic "20" value and the opaque regions were assigned a logic "1" value. Additionally, since the lens mount contained cylindrical lenses which have 180° symmetry, the code carrier was formed with two identical code regions each ranging from 0° to 179° and arranged such that diametrically opposite positions of the code carrier produced identical outputs from the positions on the code carrier 18, the only adjacent angular positions which required a transition in more than one concentric ring were 0° and 179°. This occured at two positions of the code ring.

The refractor described above is a complex instrument which contains many parts. As such, space is at a premium and the optical position detector by necessity must be very small. An indication of the size of the device can be seen by the fact that the phototransistors are spaced 0.025 inches apart and have an active area 0.018 inches square. This very close spacing of the phototransistors presented a problem in that light from the source which passed through the transparent region of one ring on the code carrier to activate the phototransistor associated therewith was sometimes received by an adjacent phototransistor and was activated thereby. To prevent light passing through one ring of the code carrier from activating more than one phototransistor, it was found necessary to place the code carrier in very close proximity, i.e. on the order of 0.005 inches, to the phototransistor array. However, because the phototransistor array is mounted on a very thin lead frame and each transistor is connected to a lead with a very thin wire, it was necessary to encapsulate the phototransistors, the wires, and the leads in a block of clear plastic in order to prevent the connecting wires from breaking. It was found that if the amount of plastic above the phototransistor array was less than five-thousandths of an inch to permit required close proximity of the code carrier to the phototransistor array, the block did not have sufficient strength to prevent breaking of the lead wires.

Hence, it is desirable to provide a unitary position detector assembly which prevents light passing through a transparent region of one code carrier ring from activating more than one phototransistor while at the same time providing a strong mounting for the phototransistor array.

Additionally, it is desirable to provide a position detector in which the position code of the code carrier has a transition in only one ring for all adjacent angular positions of the code carrier.

It is further desirable to provide a position detector in which the position code of the code carrier can provide identical outputs for multiple angular positions of the code carrier with a transition in only one ring for all adjacent angular positions.

SUMMARY OF THE INVENTION

A position detector is provided for use with a code carrier which defines a position. This carrier has sequenced radiation transmissive and non-transmissive transparent regions which define a multi-bit output. The position detector includes an array of individual photodetectors mounted adjacent one side of the code carrier and a radiation source which is mounted on the side of the code carrier opposite the photodetector array. A radiation guide is interposed between the code carrier and the photodetector array. This guide has a plurality of discrete radiation transmissive paths each of which is in exclusive communication with one photodetector. The radiation guide is manufactured by a method which is simple and inexpensive yet ensures that the radiation guides are located accurately. The transmissive and non-transmissive regions of the code carrier are arranged such that the number of photodetectors which receive radiation from the radiation source changes by one for each adjacent discrete position of the code carrier and the same binary information can define more than one position of the code carrier, such as two symmetric positions.

Another aspect of the invention is a position detector which comprises a code carrier having a pair of sectors which are comprised of a series of locations each of which is comprised of a plurality of sequenced radiation transmissive and non-transmissive bits. Each sequence of bits defines multi-bit information correlative with the position to be detected and contains at least one bit correlative to which sector the location is in. Each adjacent location contains a sequence of bits differing from each adjacent location by only one bit and each adjacent location between sectors differs by only one bit. The position detector additionally is comprised of an array of radiation detectors mounted adjacent to one side of the code carrier an in alingment with one sequence of bits. A source of radiation is mounted adjacent the code carrier on the side opposite the detector array and is directed at said sequence of bits in alignment with the detector array. Finally, a radiation guide is interposed between the code carrier and the detector array. This guide has a plurality of discrete radiation transmissive paths each of which is in communication with only one radiation detector. This construction means that radiation passing through the code carrier and through the radiation guide will be detected by the detector array in the sequence of bits corresponding with the radiated code carrier in association with the detector array.

A further aspect of the present invention is the code carrier which is useful with a radiation detector wherein a source of radiation directed at one side of the code carrier is read by the radiation detector at the other side thereof for detecting a position correlative to a position selected from the code carrier, the detector, the source, and combinations thereof. The code carrier comprises a pair of sectors which are comprised of a series of locations, each location being comprised of a plurality of sequenced radiation transmissive and non-transmissive bits. Each sequence of bits defines multi-bit binary information correlative to the position to be detected and contains at least one bit correlative to which sector the location was in. Each adjacent location contains a sequence of bits differing from each adjacent location by only one bit, and each adjacent location between sectors differs by only one bit.

Yet another aspect of the invention is a method of manufacturing a light unit having spaced rows of light transmitting guides encapsulated in an opaque housing comprising the steps of winding a transparent fiber around spacing means in a fixture to form spaced rows of fiber, positioning a mold around a portion of the rows of fiber, filling the mold with a liquid which surrounds the rows of fiber and hardens to an opaque condition, severing the ends of the rows of fiber adjacent each end of the mold after the liquid has hardened, and removing the opaque molded unit in which the rows of fiber are encapsulated from the mold.

Advantages of the present invention include a position detector assembly which is susceptible to automated manufacturing in high volume, yet is easy to manufacture and assemble. A further advantage is a position detector assembly which is very easy to align both when manufactured and by a repairman when servicing the position detector. Yet another advantage of the present invention is a code carrier which minimizes the likelihood that false readings will be generated by varying each position by one bit only, yet accomplishes such improvement with a fewer number of bits than has been required by past codes. These and other advantages will be readily apparent to those skilled in the art based upon the disclosure contained herein.

BRIEF DESCRIPTION OF THE DRAWINGS

FIG. 4 is a perspective view of a fixture used in manufacturing light guide units;

FIG. 5 is a view along line 5—5 of FIG. 4;

FIG. 6 is a perspective view of the fixture of FIG. 4 shown with a mold mounted thereon;

FIG. 7 is a perspective view showing a light guide unit being sliced from a molded block;

FIG. 8 is a view similar to that of FIG. 3 showing the light guide assembly, the phototransistor array, and the lead frame encapsulated in a block of material;

FIG. 9 is a plan view of unitary light source mounted on the phototransistor array and light guide assembly of FIG. 8;

FIG. 10 is a longitudinal sectional view along line 10—10 of FIG. 9;

DETAILED DESCRIPTION OF THE INVENTION

Although the detailed description which follows is directed to a position detector which operates in combination with a circular code carrier, it will be readily apparent that the position detector also could operate in combination with a linear code carrier. Further, although the code carrier is described as moving relative to the position detector, the position detector could be moved relative to a stationary or a moving code carrier to detect a position defined by the code carrier or the position detector.

The position detector can operate with visible light or other radiation source including but not limited to infrared radiation and ultraviolet radiation. In the description which follows, the radiation source is identified as an infrared light emitting diode. Therefore, wherever the word "light" is used it is intended to include invisible and visible light and all other forms of radiation.

The optical position detector of the instant invention is a small pre-assembled unit which cooperates with a code carrier mounted on a rotatable element and includes a radiation source, an array of photodetectors, and a unique radiation guide that transmits radiation which is recieved from one ring of a code carrier exclusively to one photodetector regardless of the distance the code carrier is from the active surface of the photodetectors. This detector is mounted in cooperation with a code carrier having an 8-bit position code comprised of sequenced and transmissive regions formed in eight concentric rings in which there is a transition from opaque to transmissive or vice versa in only one ring for each adjacent angular position indicated by the code carrier. Reference is made to FIGS. 2-14 in describing in detail the construction of the optical position detector 10 of the instant invention.

Figure 2:
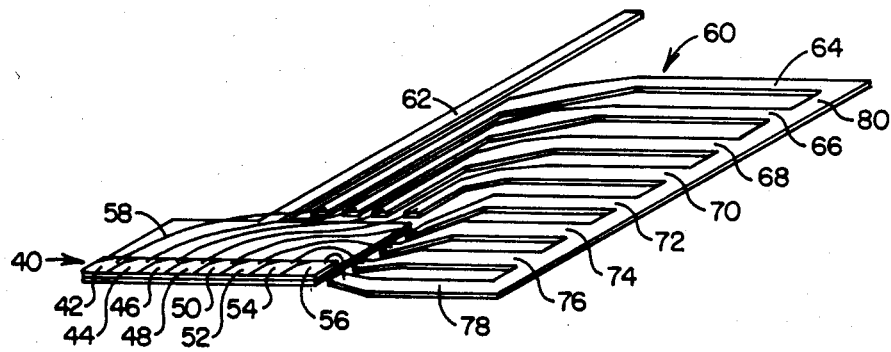
FIG. 2 is a perspective view of the phototransistors of the position detector of the instant invention mounted on a lead frame.
Figure 14:
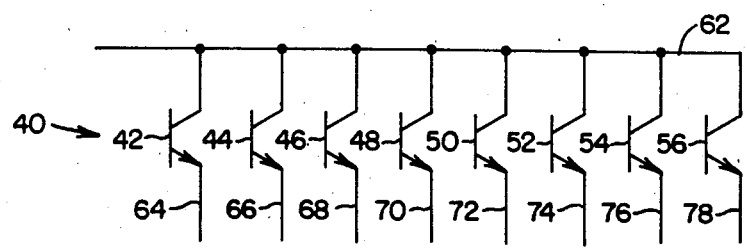
FIG. 14 is a circuit diagram of phototransistor array utilized with the optical position detector of the instant invention.

With reference to FIG. 2, an array 40 of eight photodetectors 42-56 in the form of eight discrete photo-transistors or photodiodes (which may be provided, for example, as type OPC600L silicon phototransistors marketed by Optron, Inc. of Carrollton, Tex.) are shown supported on the paddle 58 of a lead frame 60. Lead frame 60 is a stamped piece of steel approximately 0.005 inches thick and is of the type used for mounting memory integrated chips. Use of an insulating substrate with connecting leads could be used in place of lead frame 60. The collector of each photodetector 42-56 is connected to a common lead 62 which extends from paddle 58. A thin gold wire approximately 0.001 inches in diameter connects the emitter of each phototransistor 42-56 to one of the leads 64-78, respectively, of lead frame 60. This circuit is shown in FIG. 14. Typically, one end of a gold wire is bonded to a pad area formed on one corner of a phototransistor and the other end is bonded to a lead. In normal practice, the lead frame 60 is placed in a mold and the paddle 58 containing phototransistor array 40, the gold lead wires, and a portion of each of the leads 64-78 are encapsulated in clear (or opaque) plastic. Subsequent to this, the perimeter 80 of the lead frame 60 which is attached to the end of each of the leads 64-78 for support purposes is removed. This leaves the emitter of each phototransistor 42-56 connected to a separate lead 64-78, respectively, by a gold wire. The thickness of the plastic which encapsulates the phototransistors 42-56 and the leads must be sufficient to prevent the leads from flexing and the gold wires from breaking. As discussed above in connection with the optical encoder described in copending patent application Ser. No. 06/513,707, now U.S. Pat. No. 4,523,822, it was found that it was necessary to have the code carrier spaced within approximately 0.005 inches from the active surface of the phototransistors to prevent light transmitted through the code carrier to one phototransistor from being received by the active area of an adjacent phototransistor. However, it also was found that it was necessary to encapsulate the phototransistor array, the gold lead wires, and the leads with plastic having a minimum thickness of approximately 0.025 inches to prevent the lead wires from breaking. As mentioned above, the primary cause of light passing through the code carrier activating multiple phototransistors is that the phototransistors must be spaced very close together, ie. on centers 0.025 inches apart, and the active region of a phototransistor is about 0.018 inches square. The optical position detector of the instant invention solves this problem by the use of a unique light isolation unit.

Figure 3:
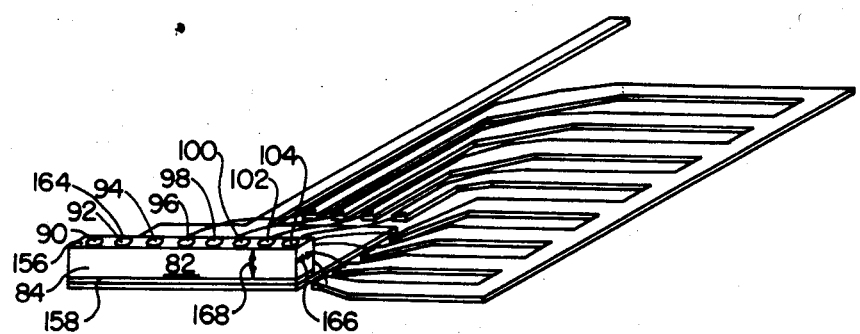
FIG. 3 is a view similar to that of FIG. 2 showing a light guide assembly mounted on the phototransistors.

With reference to FIG. 3, a narrow, rectangular opaque (preferably black) plastic light guide unit 82 is cemented on top of phototransistor array 40. Light isolation unit 82 includes a housing 84 formed of a plastic opaque to light and contains eight clear plastic light pipes or guides 90-104. These guides also could be formed of other radiation transmissive material such as a translucent plastic or may be empty holes through which the radiation passes. Guides 90-104 are laterally spaced on centers 0.025 inches apart and preferably have a diameter of approximately 0.013 inches. As mentioned above, light guide unit 82 is manufactured by a simple, inexpensive process which ensures that light guides 90-104 are acurately located within housing 84. Referring to FIG. 4-7, an I-shaped fixture 106 has a pair of rectangular end members 108 and 110 which are joined by a rectangular center member 112. Fixture 106 can be a single piece of material such as plastic or can be constructed from three separate rectangular pieces which are bonded or otherwise fastened together. A pair of identical tapered pins 114 and 116 are mounted in a pair of axially aligned, tapered bores 118 and 120 (FIG. 5) formed in end members 108 and 110 offset from member 112. A pair of identical screws 122 and 124 are mounted in a pair of axially aligned threaded holes 126 and 128 in end members 108 and 110 offest from center member 112 in the direction away from pins 114 and 116. Preferably, screws 122 and 124 are size 6 and have 40 threads per inch. One end of a continuous transparent fiber 130 having a diameter of approximately 0.013 inches, is inserted in a hole 132 formed in pin 116 and tied in a knot to anchor it. Fiber 130 is wound successively around screw 124, screw 122, pin 114, and pin 116 eight times. Fiber 130 is placed in adjacent grooves each time it passes around screws 124 and 122. Since there are 40 threads per inch on the screws 124 and 122, adjacent threads (and grooves) are spaced apart 0.025 inch and, consequently, the eight adjacent rows of fiber 130 between screws 122 and 124 are spaced 0.025 inch apart which distance is also the distance between adjacent photodetectors 42-56. When there are eight rows of fiber formed between screws 122 and 124, the end of fiber 130 is inserted in a hole, not shown, in pin 114 and pin 114 is rotated to place fiber 130 in tension.

Subsequently, mold member 134 (See FIG. 6) of a two part mold is placed on center member 112 beneath the eight rows of fiber 130. Mold member 134 is a flat piece having a rectangular cross-section. A U-shaped member 136 of the mold is placed in complemental relation to member 134. It should be noted that tightening of pin 114 to tension fiber 130 moves fiber 130 transversely in U-shaped member 136, permitting convenient alignment of fiber 130 with respect to the mold. An opaque material such as a resin of the type used for potting integrated circuits (e.g. a resin containing carbon pigment), is poured into the mold through a hole 138 (FIG. 6) in member 136. Since the resin is relatively viscous, only a small amount flows out of the open ends of the mold.

After the resin has solidified, the eight rows of fiber 130 adjacent each end of mold 134 and 136 are cut by a scissors or knife and a rectangular block 140 of resin having eight rows of fiber 130 encapsulated therein (FIG. 7) is removed from the mold 134 and 136. Light guide units 82 of desired height are sliced from block 140 using a tool such as a knife 142. Obviously, the solid resin forms housing 84 and the eight rows of fiber 130 form light guides 90-104.

Referring to FIGS. 2 and 3, the top and bottom surfaces 156, 158, respectively, of light guide unit 82 are polished. Guide unit 82 is mounted on phototransistor array 40 such that the center of each of the clear plastic guides 90-104 is aligned with the center of one of the phototransistors 42-56, respectively. Polishing bottom surface 158 ensures that guides 90-104 are mounted in close contact with the active surfaces of each of the phototransistors 42-56 and that light which passes through one of the guides will not scatter to such an extent as to be received by an adjacent phototransistor. In the phototransistors 42-56 used in the subject optical position detector 10 (See FIGS. 9-11), the lead pad for connecting the emitter to a lead 64-78 by means of a gold wire was formed in one corner of the active area as seen in FIG. 2. To avoid interference between the lead wires and the rear surface 164 (FIG. 3) of guide unit 82 adjacent the lead pads, it was necessary to make the distance between rear surface 164 and the outer surface of the light guides 90-104 approximately 0.005 inches. The width dimension of light guide unit 82 on the opposite side of the light guides 90-104 is not critical. Consequently, the width 166 of unit 82 (FIG. 3) is preferably approximately 0.050 inches. Unit 82 overlies the active areas of the phototransistor 90-104. The height 168 of guide unit 82 is not critical, but is preferably within a range of 0.025-0.050 inches. After unit 82 is mounted on phototransistor array 40, unit 82, phototransistors 42-58, the gold lead wires and a portion of lead frame 60 are encapsulated in an opaque plastic to form a rectangular block 160 (FIG. 8). From the above it can be seen that the active areas of phototransistors 42-56 can receive light only through light guides 90-104.

Figure 11:
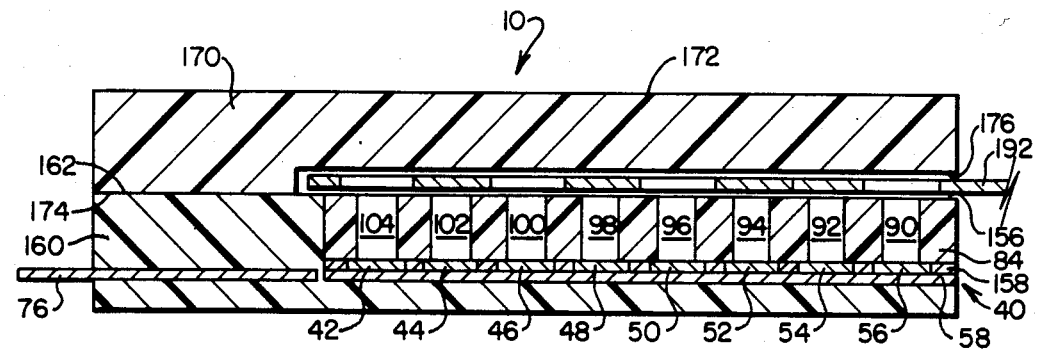
FIG. 11 is a lateral sectional view along line 11—11 of FIG. 9.

Referring to FIGS. 9-11, the optical position detector 10 of the instant invention further includes a light distribution unit 170 which is comprised of a rectangular block of clear plastic having a generally flat top surface 172 and a flat bottom surface 174 with an intermediate surface 176 which is offset from and parallel with bottom surface 174 by a approximately 0.005 inches. A light source consisting of an infrared light emitting diode (LED) 178 is embedded in one end of light unit 170 which has a reflecting surface 180 formed in a groove 184 at a 45° angle with respect to intermediate surface 176. Light from LED 178 is reflected vertically downward by reflecting surface 180. If the groove 184 in light unit 170 which resulted from molding reflecting surface 180 therein is undesirable, aluminum can be evaporated on the top of outer surface 182 of reflecting surface 180. This permits groove 184 to be filled, an arrangement which may be desirable to keep dirt out of the unit.

Referring to FIG. 9-11, it can be seen that the bottom surface 174 of light unit 170 is mounted on the top surface 162 of rectangular block 160 such that reflecting surface 180 extends laterally over each of the light pipes or guides 90-104. In other words, light guides 90-104 are aligned with reflecting surface 180 (FIG. 10) such that light from LED 178 which is reflected vertically downward by surface 180 can be received by each phototransistors 42-56 Thus, the optical position detector 10 of the instant invention is a compact, preassembled unit which includes an array 40 of phototransistors 42-56, means for isolating the phototransistors in the form of light guides 90-104, all contained in rectangular block 160; and a light distribution unit contained in block 170 which has a reflecting surface 180 aligned with the phototransistors 42-56 to direct light thereto.

Figure 12:
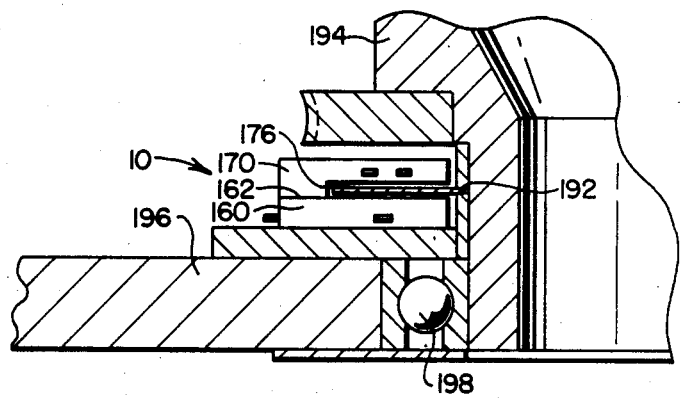
FIG. 12 is a view of the unit of FIG. 9 mounted on a rotating assembly.

Optical position detector 10 is adapted to be mounted in conjunction with a code carrier 192 which in turn is adapted to be mounted on a rotatable element 194 as shown in FIGS. 11 and 12 to thereby determine the angular position of element 194 as will be explained hereinafter. FIG. 12 shows that detector 10 may be mounted on a housing 196 which, in turn, supports a rotatable element 194 and which is connected thereto by conventional fastening means such as bolts, not shown, such that annular code carrier 192 is received in the slot defined by intermediate surface 176 of light unit 170 and top surface 162 of rectangular block 160. The top surface 156 of light guide unit 82 which contains light guides 90-104 (FIG. 11) is coplanar with the top surface 162 of rectangular block 160. Surfaces 156 and 162 are polished such that code carrier 194 can slide against them without being damaged. This is important because the narrow width (approximately 0.010 inches) of the slot formed between intermediate surface 176 and surface 162 makes it almost impossible for code carrier 192 to avoid contacting the surfaces 156 and 162. Referring again to Fig. 12, it can be seen that rotatable control element 194 is mounted in housing 196 by a bearing 198. Code carrier 192 is rigidly affixed to control element 194 such that it is rotable therewith. For purposes of this example it will be assumed that control element 194 is of such a nature that it is desirable to read the angular position of element 194 in 1° increments and that it is further desirable to provide the same positional code for diametrically opposite angular positions of element 194. The unique positional code of code carrier 192 which permits any adjacent angular position of a rotatable element to be defined by a transition of only one bit and which can provide the same code for more than one angular position (such as diametrically opposite) of the rotatable element now will be described.

Figure 13:
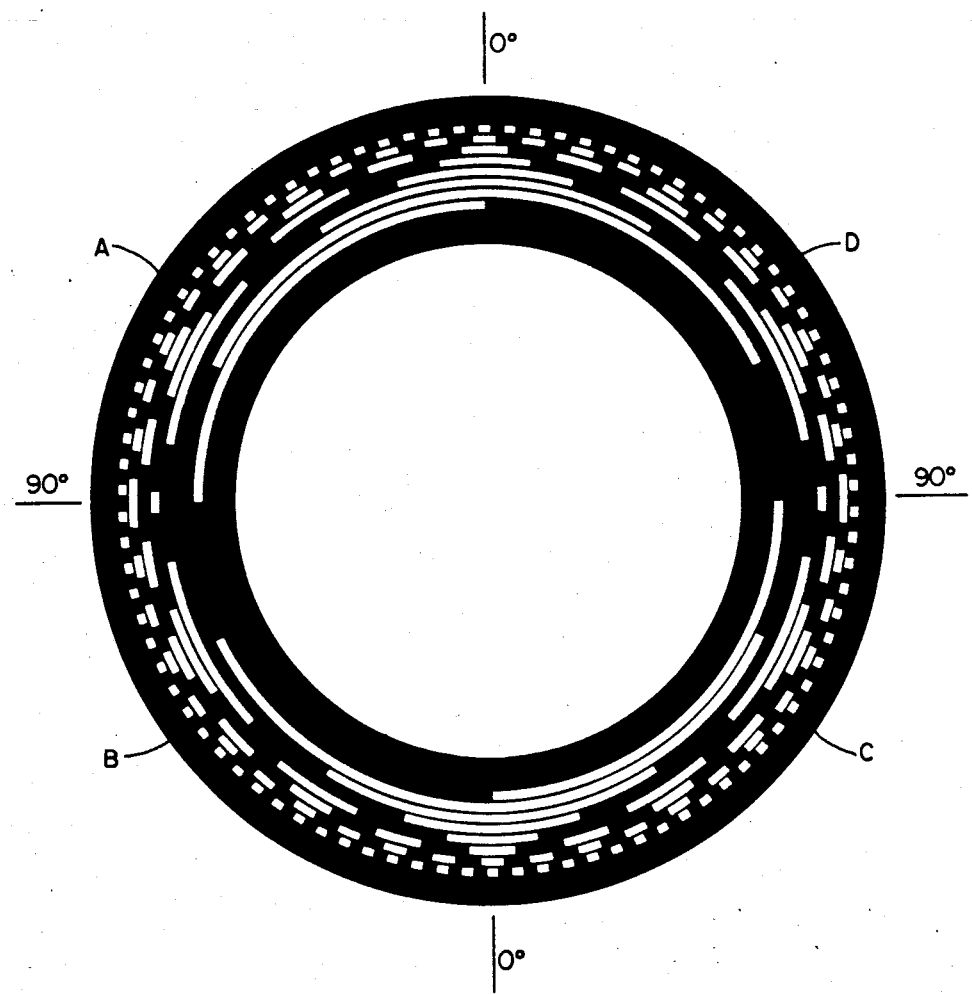
FIG. 13 is a plan view of a code carrier ring.

Referring to FIG. 13, it can be seen that code carrier 192 is an annular disc and that the positional code is of an 8-bit, selectively opaque-transparent variety. It should be noted that although the code is described as having opaque and transparent regions on the code carrier, these regions need only be radiation non-transmissive and transmissive. A translucent region also is radiation transmissive and could be substituted for a transparent region. Any material which is non-transmissive of radiation could be substituted for an opaque region. In order to provide at least a 1° accuracy readout, code carrier 192 is subdivided to provide coded readout for each 1° sector thereof. In order to provide an identical output for diametrically opposite positions of code carrier 192 the disc is divided into two identical 180° sectors. The reading of angles which extend from 0° through 179° for each sector of the disc requires an 8-bit binary code within each sector of 1°. The position code is provided by selectively sequenced opaque and transparent intervals which are arranged in eight concentric rings on carrier 192. As previously mentioned, in order to avoid obtaining spurious readings during the transition from one angular position or sector to an adjacent one, which may occur if there is a transition of more than one bit, it is desirable to provide a position code in which a transition from one sector to an adjacent one is evidenced by only a one-bit change.

Although, in the aforementioned copending application, a Gary code was used, such a code requires more than a one-bit change when there is a transition from 179° back to 0°. The unique positional code on code carrier 192 of the instant invention eliminates the multi-bit change between 179° and 0°.

Referring to Table 1 and FIG. 13, it will be seen that the code in sector A between 0° and 90° is the same as the code used in sector C which also is between 0° and 90°. Such symmetry is required due to the nature of the refractor and its use. The same identity between sectors B and D also exists. The code between 0° and 90° in sectors A and C contains a 7-bit output (information) which corresponds to an angle ranging between 0° and 90°. The eight bit determines whether the readins is being taken in sector A or in sector B (or conversely in sector C or in sector D because of symmetry). It will be observed that the eight sector-determining bit is transmissive in sector A and is non-transmissive in sector B. Note that the code carrier reads increasing angular positions counter-clockwise about the code carrier because the refractor is made so that the code carrier is rotatable clockwise to indicate increasing angular position. Of course, the reverse of this sequence is possible. The remaining output sequence of bits determinative of the angle are mirror images in sectors A and B (and C and D) about the 90° mark. That is, the 7-bit angular output for 89° is the same as 91° and so forth. Those skilled in the art will appreciate that the use of a code which comprises a sector-determining portion and a positional-determining portion within the sector permits the determination of positions by a code carrier to utilize fewer numbers of bits than is required by a conventional Gray code. Thus, for each pair of sectors, one bit will determine within which sector a reading is being taken. This sector-determining bit utilization permits an indentical remaining poriton of the bit sequence to be used in adjacent sectors while retaining the advantages of only having a one-bit change between adjacent locations. In a general sense, when m pairs of sectors each contain locations containing n bits, each location will have m bits for determining each sector and n-m bits available for determining the position within each sector, n being whole number and n being greater than m.

Figure 1:
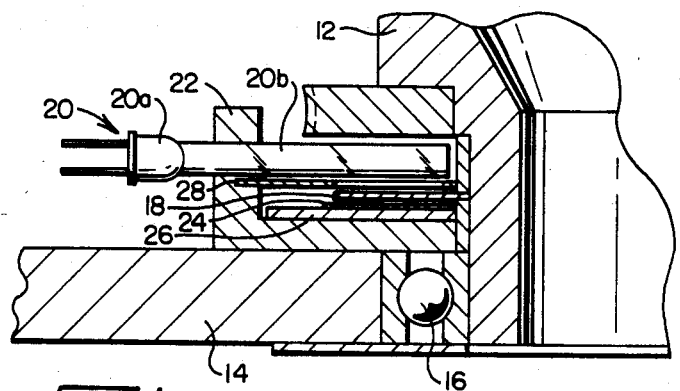
FIG. 1 is an illustration of a prior art optical position detector.

It should be noted that the code defined in FIG. 13 and in FIG. 1 is not the only code which will provide a one-bit change for all adjacent sectors. Appropriate codes may be formed by interchanging the positions of any of the concentric rings on code carrier 192, for example. Thus, in the embodiment of the code carrier depicted in FIG. 13, it is possible to have eight factorial versions of an 8-bit code, each version providing a one-bit change for each adjacent sector. It will be appreciated that code carrier 192 could be divided into any number of sectors, for example six identical 60° sectors. Such a code carrier would require two bits to be reserved for determination of the three sectors which comprise 0°-60°, 61°-120°, and 121°-0°. Symmetry for the refractor version of code carrier 192 would make the next three sectors to be identical to the initial three sectors. The remaining sequence of bits for the oode at each location even could be identical within each of the three sectors since the precise sector location is determined by the sector bits. Accordingly, the accuracy of the code carrier can be increased or decreased by increasing or decreasing the number of sectors and making a corresponding change in the number of bits in each word.

Finally, it is important to note that 0° was chosen to be an all-transmissive or clear region in order to improve (i.e. save time) manufacturing assembly and repair reassembly alignment and calibration. The all-transmissive region even provides a visual check to the worker handling the unit. Further, it will be understood that a full 360° code carrier is not always utilized nor required in ophthalmic refractors, i.e. some refractors operate on a 270° or other convenient scale. The code carrier and position detector of the present invention is readily adaptable to such refractors, as those skilled in this art will appreciate.

Operation of optical position detector 10 can best be seen by again referring to FIG. 11. As previously noted, detector 10 is positioned such that the outer portion of code carrier 192 is received in the slot defined by intermediate surface 176 of light unit 170 and the top surface 162 of block 160. It is aligned such that each of the eight concentric rings which define the position code on code carrier 192 is aligned with the center of one of the light guides 90–104 in light guide unit 82 in block 160 as shown in FIG. 11. It should be observed that the concentric rings of code carrier 192 have a width of 0.025 inches which is the distance between centers of phototransistors 42–56 and of light guides 90–104. Thus, the diameter of light guides 90–104 (0.013 inches) is substantially less than the width of the concentric rings formed on code carrier 142 and less than the width of the active areas of the phototransistor 42–56. A narrow band of light from LED 178 is reflected vertically downward from surface 180 of light unit 170. This light falls on the eight concentric rings of code carrier 192 above light guides 90–104. If the light falls on a transparent region of a ring the light passes through, the light guides 90–104 beneath that ring and activates the phototransistor 42–56 associated with that ring. If the light falls on an opaque region of a ring, no light is passed to the light guides 90–104 beneath that ring and the phototransistor associated therewith remains inactive. A code is generated for each angular position or sector of carrier 192 depending upon which phototransistors are active and which are inactive. The code changes for each angular position of code carrier 192 as described above. With the optical position detector 10 of the instant invention, the only adjustment required is one which causes the proper radial alignment of the concentric position code rings on code carrier 192 with light guides 90–104 in light guide unit 82.

From the above, it can be seen that the optical position detector 10 of the instant invention substantially eliminates spurious outputs resulting from multi-bit changes between adjacent angular positions and inaccurate outputs caused when light passing through one ring of a code carrier to activate the associated photodetector simultaneously activates an adjacent photodetector, while at the same time providing a strong support for the photodetector and the associated lead frame.

Since certain changes may be made in the above-described system, method and apparatus without departing from the scope of the invention herein, it is intended that all matter contained in the description thereof or shown in the accompanying drawings shall be interpreted as illustrative and not in a limiting sense.

TABLE 1

| Setting- | Position Code | | Setting- | Position Code | |
|---|---|---|---|---|---|
| Degrees | Inside | Outside | Degrees | Inside | Outside |
| 1 | 0000 | 0001 | 92 | 1111 | 1100 |
| 2 | 0000 | 0011 | 93 | 1111 | 1101 |
| 3 | 0000 | 0010 | 94 | 1111 | 1111 |
| 4 | 0000 | 0110 | 95 | 1111 | 1110 |
| 5 | 0000 | 0111 | 96 | 1111 | 1010 |
| 6 | 0000 | 0101 | 97 | 1111 | 1011 |
| 7 | 0000 | 0100 | 98 | 1111 | 1001 |
| 8 | 0000 | 1100 | 99 | 1111 | 1000 |
| 9 | 0000 | 1101 | 100 | 1110 | 1000 |
| 10 | 0000 | 1111 | 101 | 1110 | 1001 |
| 11 | 0000 | 1110 | 102 | 1110 | 1010 |
| 12 | 0000 | 1010 | 103 | 1110 | 1010 |
| 13 | 0000 | 1011 | 104 | 1110 | 1110 |
| 14 | 0000 | 1001 | 105 | 1110 | 1111 |
| 15 | 0000 | 1000 | 106 | 1110 | 1101 |
| 16 | 0001 | 1000 | 107 | 1110 | 1100 |
| 17 | 0001 | 1001 | 108 | 1110 | 0100 |
| 18 | 0001 | 1011 | 109 | 1110 | 0101 |
| 19 | 0001 | 1010 | 110 | 1110 | 0111 |
| 20 | 0001 | 1110 | 111 | 1110 | 0110 |
| 21 | 0001 | 1111 | 112 | 1110 | 0010 |
| 22 | 0001 | 1101 | 113 | 1110 | 0011 |
| 23 | 0001 | 1100 | 114 | 1110 | 0001 |
| 24 | 0001 | 0100 | 115 | 1110 | 0000 |
| 25 | 0001 | 0101 | 116 | 1010 | 0000 |
| 26 | 0001 | 0111 | 117 | 1010 | 0001 |
| 27 | 0001 | 0110 | 118 | 1010 | 0011 |
| 28 | 0001 | 0010 | 119 | 1010 | 0010 |
| 29 | 0001 | 0011 | 120 | 1010 | 0110 |
| 30 | 0001 | 0001 | 121 | 1010 | 0111 |
| 31 | 0001 | 0000 | 122 | 1010 | 0101 |
| 32 | 0011 | 0000 | 123 | 1010 | 0100 |
| 33 | 0011 | 0001 | 124 | 1010 | 1100 |
| 34 | 0011 | 0011 | 125 | 1010 | 1101 |
| 35 | 0011 | 0010 | 126 | 1010 | 1111 |
| 36 | 0011 | 0110 | 127 | 1010 | 1110 |
| 37 | 0011 | 0111 | 128 | 1010 | 1010 |
| 38 | 0011 | 0101 | 129 | 1010 | 1011 |
| 39 | 0011 | 0100 | 130 | 1010 | 1001 |
| 40 | 0011 | 1100 | 131 | 1010 | 1000 |
| 41 | 0011 | 1101 | 132 | 1011 | 1000 |
| 42 | 0011 | 1111 | 133 | 1011 | 1001 |
| 43 | 0011 | 1110 | 134 | 1011 | 1011 |
| 44 | 0011 | 1010 | 135 | 1011 | 1010 |
| 45 | 0011 | 1011 | 136 | 1011 | 1110 |
| 46 | 0011 | 1001 | 137 | 1011 | 1111 |
| 47 | 0011 | 1000 | 138 | 1011 | 1101 |
| 48 | 0010 | 1000 | 139 | 1011 | 1100 |
| 49 | 0010 | 1001 | 140 | 1011 | 0100 |
| 50 | 0010 | 1011 | 141 | 1011 | 0101 |
| 51 | 0010 | 1010 | 142 | 1011 | 0111 |
| 52 | 0010 | 1110 | 143 | 1011 | 0110 |
| 53 | 0010 | 1111 | 144 | 1011 | 0010 |
| 54 | 0010 | 1101 | 145 | 1011 | 0011 |
| 55 | 0010 | 1100 | 146 | 1011 | 0001 |
| 56 | 0010 | 0100 | 147 | 1011 | 0000 |
| 57 | 0010 | 0101 | 148 | 1001 | 0000 |
| 58 | 0010 | 0111 | 149 | 1001 | 0001 |
| 59 | 0010 | 0110 | 150 | 1001 | 0011 |
| 60 | 0010 | 0010 | 151 | 1001 | 0010 |
| 61 | 0010 | 0011 | 152 | 1001 | 0110 |
| 62 | 0010 | 0001 | 153 | 1001 | 0111 |
| 63 | 0010 | 0000 | 154 | 1001 | 0101 |

TABLE 1-continued

| Setting- | Position Code | | Setting- | Position Code | |
|---|---|---|---|---|---|
| Degrees | Inside | Outside | Degrees | Inside | Outside |
| 64 | 0110 | 0000 | 155 | 1001 | 0100 |
| 65 | 0110 | 0001 | 156 | 1001 | 1100 |
| 66 | 0110 | 0011 | 157 | 1001 | 1101 |
| 67 | 0110 | 0010 | 158 | 1001 | 1111 |
| 68 | 0110 | 0110 | 159 | 1001 | 1110 |
| 69 | 0110 | 0111 | 160 | 1001 | 1010 |
| 70 | 0110 | 0101 | 161 | 1001 | 1011 |
| 71 | 0110 | 0100 | 162 | 1001 | 1001 |
| 72 | 0110 | 1100 | 163 | 1001 | 1000 |
| 73 | 0110 | 1101 | 164 | 1000 | 1000 |
| 74 | 0110 | 1111 | 165 | 1000 | 1001 |
| 75 | 0110 | 1110 | 166 | 1000 | 1011 |
| 76 | 0110 | 1010 | 167 | 1000 | 1010 |
| 77 | 0110 | 1011 | 168 | 1000 | 1110 |
| 78 | 0110 | 1001 | 169 | 1000 | 1111 |
| 79 | 0110 | 1000 | 170 | 1000 | 1101 |
| 80 | 0111 | 1000 | 171 | 1000 | 1100 |
| 81 | 0111 | 1001 | 172 | 1000 | 0100 |
| 82 | 0111 | 1011 | 173 | 1000 | 0101 |
| 83 | 0111 | 1010 | 174 | 1000 | 0111 |
| 84 | 0111 | 1110 | 175 | 1000 | 0110 |
| 85 | 0111 | 1111 | 176 | 1000 | 0010 |
| 86 | 0111 | 1101 | 177 | 1000 | 0011 |
| 87 | 0111 | 1100 | 178 | 1000 | 0001 |
| 88 | 0111 | 0100 | 179 | 1000 | 0000 |
| 89 | 0111 | 0101 | 0 | 0000 | 0000 |
| 90 | 1111 | 0101 | 1 | 0000 | 0001 |
| 91 | 1110 | 0100 | | | |

I claim:

1. In a position detector wherein a code carrier having pre-determined sequences of transmissive and non-transmissive areas, each sequence defining multi-bit information, is interposed between a source of radiation and a detector for determining the position of one of said code carrier or said detector, one of said detector or code carrier being moveable, the improvement which comprises:
   (a) an array of radiation detectors mounted adjacent to one side of said code carrier;
   (b) said source of radiation mounted adjacent said code carrier on the side opposite said radiation detector array; and
   (c) a radiation guide interposed between said radiation source and said radiation detector array, said radiation guide having a plurality of discrete radiation transmissive paths each of which is in communication with only one radiation detector.

2. The position detector of claim 1 in which said radiation guide includes a housing which is non-transmissive of said radiation and contains a plurality of spaced-apart, discrete, radiation transmissive paths formed in said housing.

3. The position detector of claim 2 in which said radiation paths comprise radiation-transmissive fiber.

4. The position detector of claim 3 in which the cross-sectional area of each radiation path is less than the active area of each detector with which it is associated.

5. The position detector of claim 3 which is adapted for said code carrier to be disposed between said radiation source and said radiation guide.

6. A position detector comprising:
   (a) a code carrier having a pair of sectors which are comprised of a series of locations each of which is comprised of a plurality of sequenced radiation transmissive and non-transmissive bits, each sequence of bits defining multi-bit binary information correlative with a position to be detected and containing at least one bit correlative to which sector the location is in, each adjacent location containing a sequence of bits differing from each adjacent location by only one bit, and each adjacent location between sectors differing by only one bit;

(b) an array of radiation detectors mounted adjacent to one side of said code carrier and in alignment with one sequence of bits;

(c) a source of radiation mounted adjacent said code carrier on the side opposite said detector array and directed at said sequence of bits in alignment with said detector array;

(d) a radiation guide interposed between said code carrier and said detector array, said guide having a plurality of discrete radiation transmissive paths each of which is in communication with only one radiation detector, whereby radiation passing through said code carrier and through said radiation guide will be detected by said detector array in the sequence of bits corresponding with the radiated code carrier in association with said detector array.

7. The position detector of claim 6 wherein said radiation guide includes a housing which is non-transmissive of radiation and contains a plurality of spaced-apart, discrete, radiation transmissive paths formed in said housing.

8. The position detector of claim 7 wherein said paths comprise radiation-transmissive fiber.

9. The position detector of claim 7 wherein said detector array is mounted on a lead frame.

10. The position detector of claim 7 wherein said detector array is mounted on an insulating substrate with connecting leads.

11. The position detector of claim 7 wherein the cross-sectional area of each radiation path is less than the active area of each detector with which it is in association.

12. The position detector of claim 7 wherein the cross-sectional area of each radiation path is less than the area of each bit with which it is in association.

13. The position detector of claim 8 wherein said code carrier locations are radially-disposed on said code carrier.

14. The position detector of claim 13 wherein said code carrier is adapted to be mounted for rotation.

15. The position detector of claim 14 wherein said code carrier contains two pairs of identical sectors each of which contains 90 radially-disposed locations, there being eight bits in each location of which seven bits are said output bits.

16. A circular code carrier for use with a radiation detector wherein a source of radiation directed at one side of said code carrier is read by said radiation detector at the other side thereof for detecting a position correlative to a position selected from the code carrier, the detector, the source, and combinations thereof, which comprises:

at least two pairs of sectors which are comprised of a series of locations each locations being comprised of a plurality of sequenced radiation transmissive and non-transmissive bits, each sequence of bits defining multi-bit binary information correlative to said position to be detected and containing at least one bit correlative to which sector the location is in, each adjacent locations containing a sequence of bits differing from each adjacent location by only one bit, and each adjacent location between sectors differing by only one bit, said sector pairs being mirror images except for said at least one sector location bit.

17. The code carrier of claim 16 which contains m pairs of sectors each of which contains locations containing n bits, each location having m bits for determining each sector and n−m bits available for determining the position within each sector, n being whole number and n being greater than m.

18. The code carrier of claim 16 which contains two pairs of identical sectors, each sector containing 90 locations.

19. The code carrier of claim 18 wherein each location has 8 bits.

20. The code carrier of claim 16 wherein said radiation is infrared radiation.

* * * * *